United States Patent [19]

McFadden

[11] 4,111,463

[45] Sep. 5, 1978

[54] SEPARABLE COUPLING FOR PLURAL PRESSURE LINES

[75] Inventor: Buryl L. McFadden, Dayton, Ohio

[73] Assignee: The United States of America as represented by the Secretary of the Air Force, Washington, D.C.

[21] Appl. No.: 804,488

[22] Filed: Jun. 7, 1977

[51] Int. Cl.² .............................................. F16L 35/00
[52] U.S. Cl. ....................................... 285/25; 285/93; 285/137 R; 285/321; 285/349
[58] Field of Search ....................... 285/24, 25, 26, 27, 285/28, 29, 137 R, 349, 321, 93; 137/594, 625.18

[56] References Cited

U.S. PATENT DOCUMENTS

| 3,214,195 | 10/1965 | Zahuranec et al. | 285/137 R X |
| 3,305,249 | 2/1967 | Zahuranec | 285/137 R X |
| 3,516,492 | 6/1970 | Petersen | 285/26 X |
| 3,527,480 | 9/1970 | Larson | 285/137 R X |
| 3,820,828 | 6/1974 | Fiddler | 285/137 R |
| 3,933,379 | 1/1976 | Pontigny | 285/137 R |
| 4,007,951 | 2/1977 | Legris | 285/137 R |

Primary Examiner—Dave W. Arola
Attorney, Agent, or Firm—Joseph E. Rusz; Richard J. Killoren

[57] ABSTRACT

A separable coupling, for a plurality of pressure lines, having a flat interface plate with a plurality of apertures located in an annular configuration and with tubular members being secured to the plate in alignment with each aperture. A plurality of tubular studs are supported in a guide ring in the same configuration as the apertures in the interface plate. The guide ring is slidably supported on a mounting plate with the studs passing through holes in the mounting plate. O-rings are positioned in the ends of the studs which are spring loaded to provide a seal around each of the apertures between each of the studs and the interface plate.

5 Claims, 6 Drawing Figures

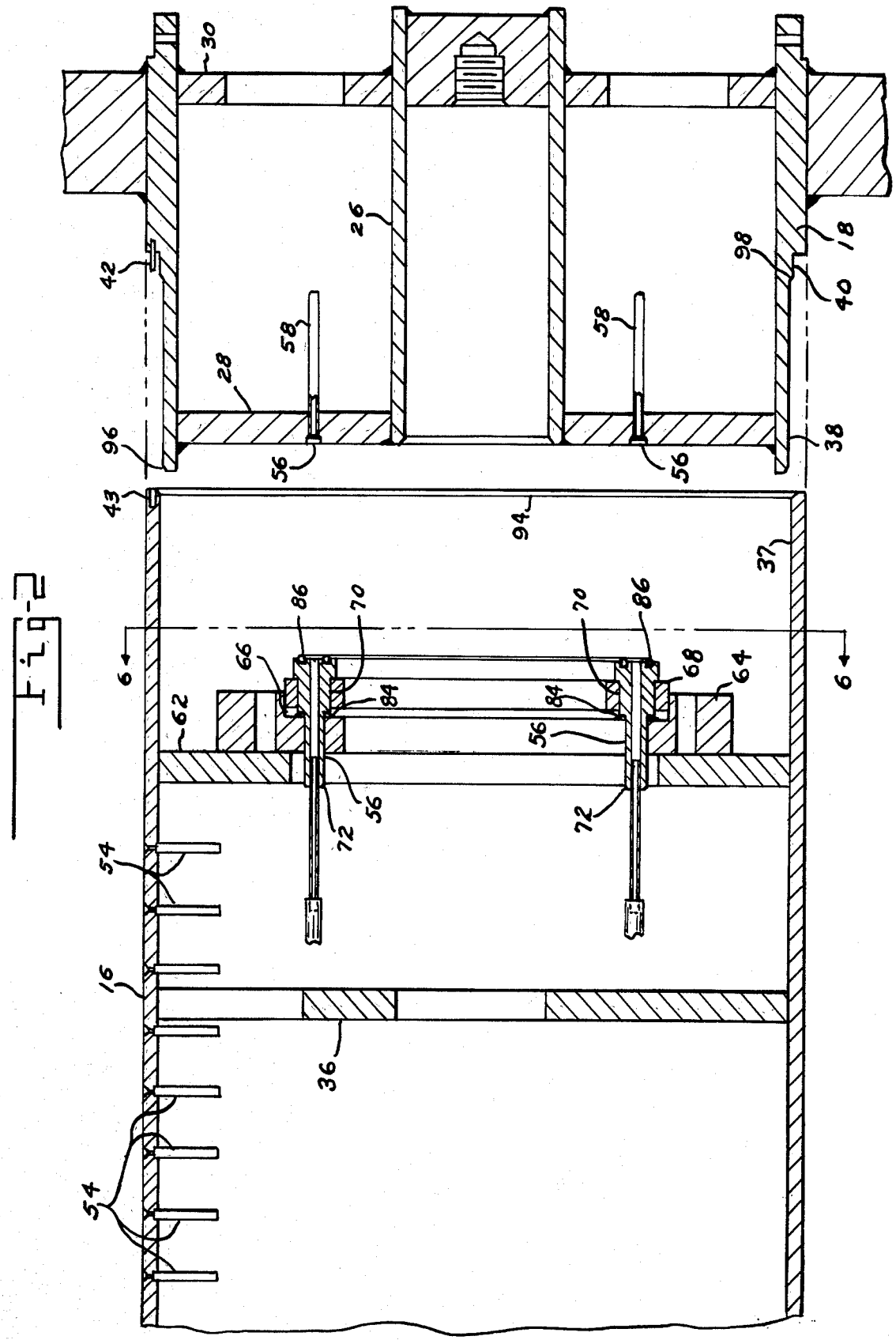

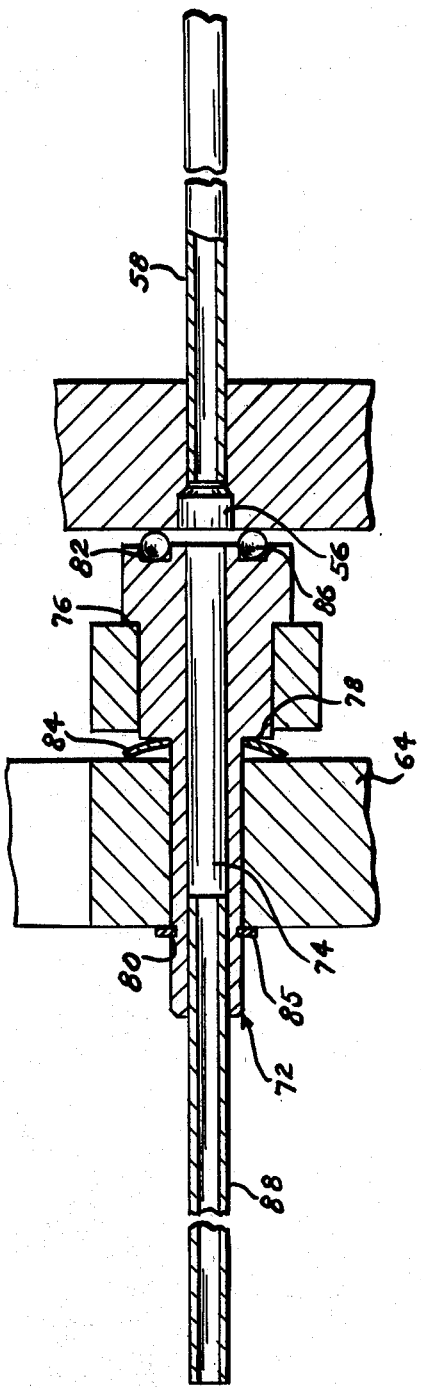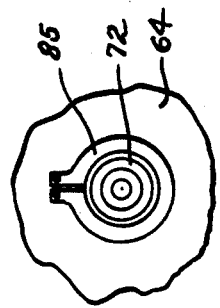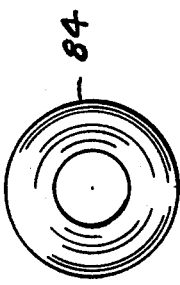

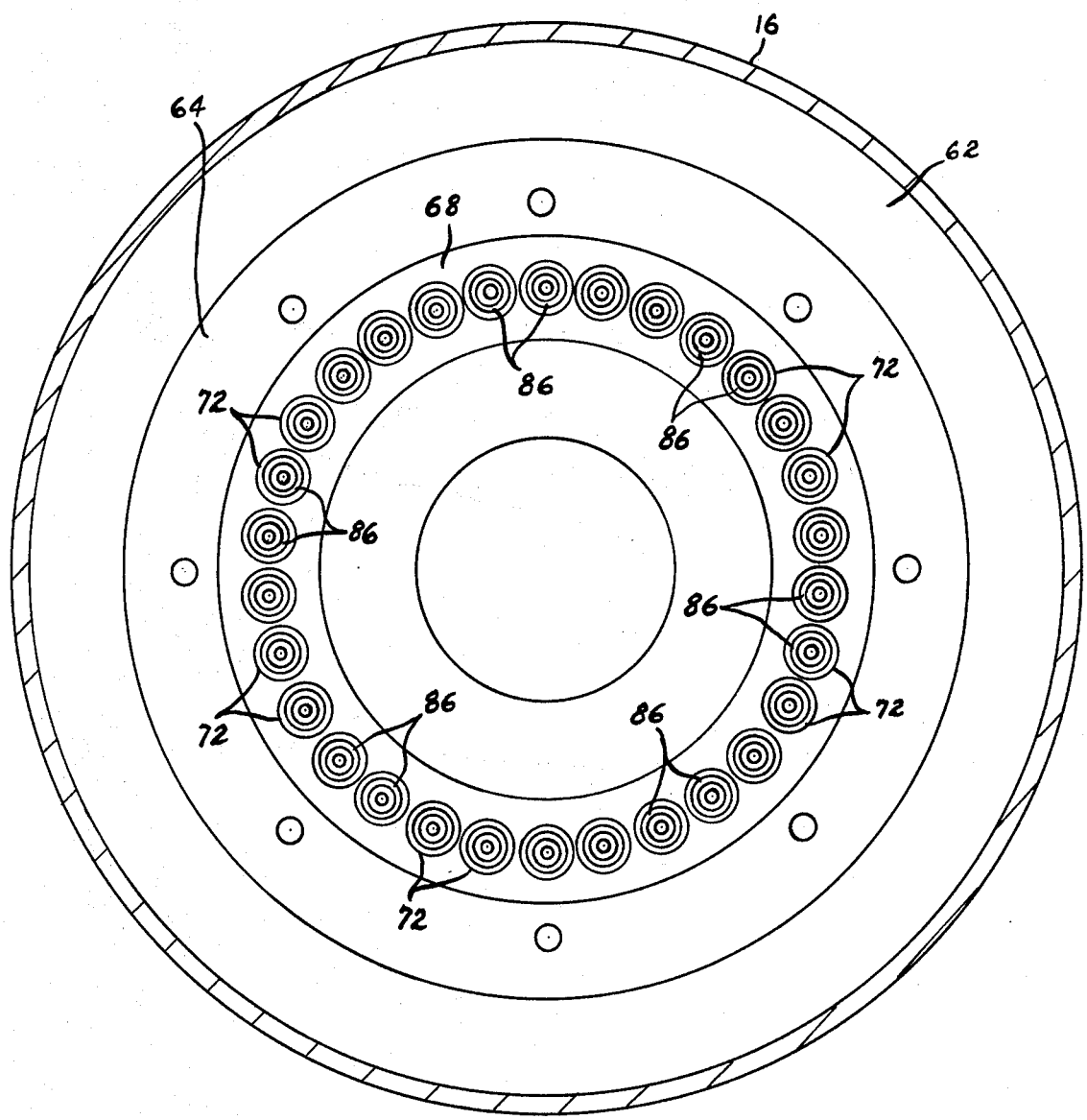

SEPARABLE COUPLING FOR PLURAL PRESSURE LINES

RIGHTS OF THE GOVERNMENT

The invention described herein may be manufactured and used by or for the Government of the United States for all governmental purposes without the payment of any royalty.

BACKGROUND OF THE INVENTION

This invention relates to a separable coupling for a plurality of pressure lines.

The patents to Fiddler, U.S. Pat. No. 3,820,828, and Pontigny, U.S. Pat. No. 3,933,379, relate to systems for interconnecting multiple tubes or channels.

It is sometimes necessary to provide pressure tight seals in multiple lines in a system which is subject to repeated assembly-disassembly operations. When it is necessary to interconnect multiple lines across an interface, wherein the interface is inaccessible it is difficult to provide tight seals in all of the pressure lines.

BRIEF SUMMARY OF THE INVENTION

According to this invention, a separable coupling for multiple pressure lines is provided wherein a plurality of connector studs are supported in a guide ring which is slidably supported in a mounting plate. The studs pass through holes in the mounting plate and are secured in the mounting plate by retainer rings. An O-ring is positioned in an annular slot at the end of each of the studs. Annular springs surround the studs and are positioned between a shoulder on the studs and the mounting plate. The studs are aligned with apertures in an interface plate by matching tubular members with circumferential alignment being provided by a pin in one tubular member which engages a hole in the second tubular member.

IN THE DRAWINGS

FIG. 2 is an enlarged partially schematic view of the separable coupling used in the device of FIG. 1.

FIG. 3 is an enlarged partially cut away view of one of the coupling elements for the device of FIG. 2.

FIG. 4 is a plan view of the spring element shown in FIG. 3.

FIG. 5 is a cut away left end view of the device of FIG. 3.

FIG. 6 is a partially schematic sectional view of the device of FIG. 2 along the line 6—6.

DETAILED DESCRIPTION OF THE INVENTION

Figure 1:
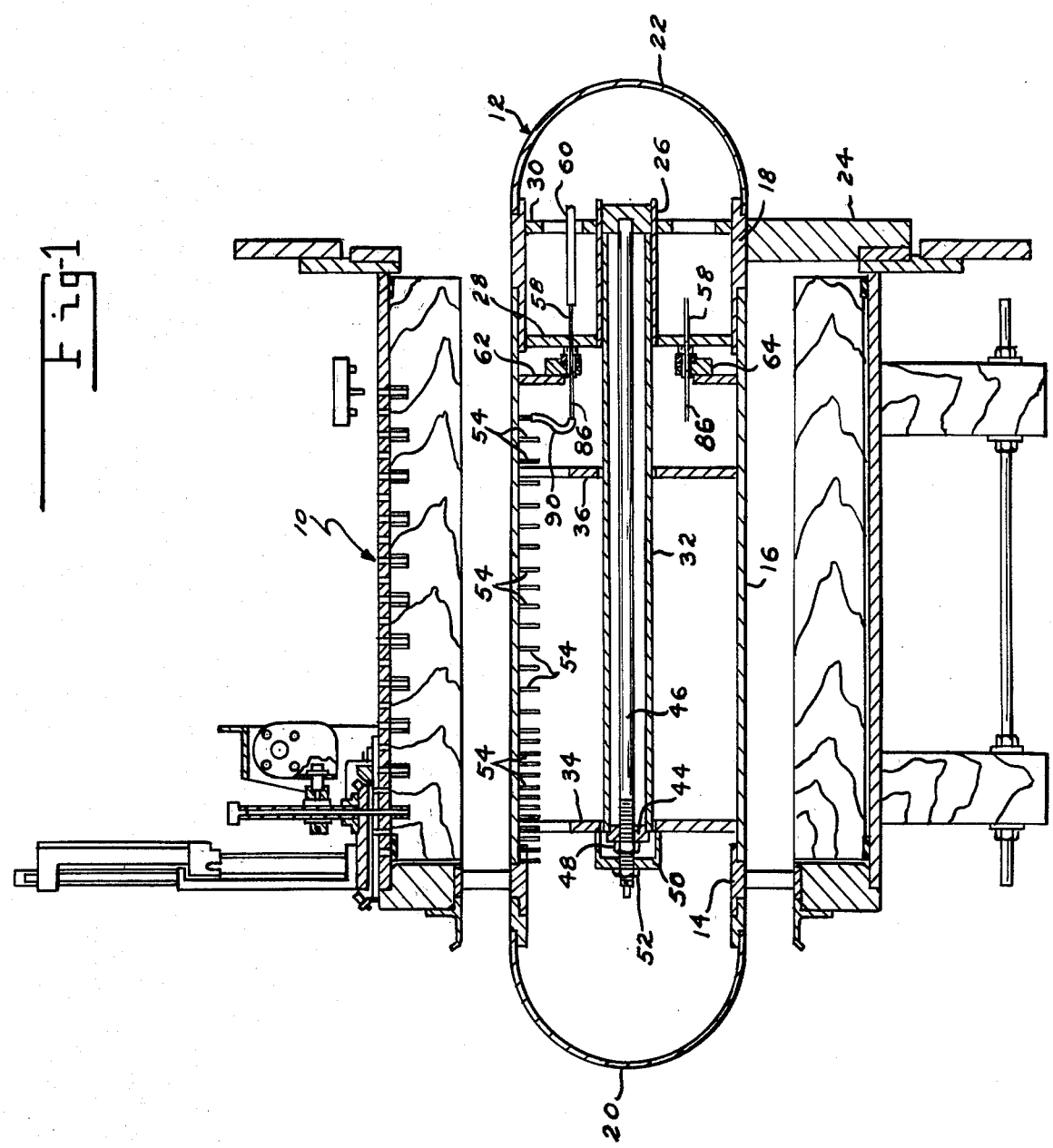
FIG. 1 is a partially schematic view of a wind tunnel test section using the device of the invention.

Reference is now made to FIG. 1 of the drawing which shows a wind tunnel test section 10, having a center body 12.

The center body 12 includes a blade assembly 14, a first cylindrical member 16, a second cylindrical member 18 and two end cones 20 and 22. The cylindrical member 18 is supported within the wind tunnel test section by three supports 24, one of which is shown. The blade assembly provides support at the other end of the center body.

A tubular member 26 is supported within cylindrical member 18 by means of plate members 28 and 30. The tubular member 26 provides support for a support guide member 32. The cylindrical member 16 has guide plates 34 and 36 which ride on support guide member 32 during the assembly operation. The tubular member 18 includes guide surfaces 38 and 40 and a guide pin 42 which engages guide hole 43, as shown in FIG. 2. The cylinder 16 is held in position on cylinder 18 by means of plug clamp member 44, a stud 46 and a nut 48. Additional support is provided by clamp member 50 and nut 52. A plurality of pressure sampling tubes 54 are positioned along the length of the cylindrical member 16.

The plate member 28 has a plurality of apertures 56 which communicate with tubular elements 58 which are cemented into holes in plate member 28. Though 30 such tubular elements are located in plate member 28, only two are shown in FIGS. 1 and 2 to simplify the drawing. Flexible tubes 60, one of which is shown, are connected to each of the tubular elements 58.

A coupling element support plate 62 is secured to the cylindrical member 16 by screws, not shown. A mounting plate 64 is bolted to the support plate 62. The mounting plate 64 has a recess 66 for receiving a floating guide ring member 68. The ring member 68 includes a plurality of holes 70 for receiving a plurality of tubular stud members 72. The ring member 68 acts to position a stud member in alignment with each of the apertures 56 in plate member 28.

As shown in greater detail in FIG. 3, each of the stud members 72 has a central passage 74, a first shoulder 76, a second shoulder 78, a spring snap ring slot 80 and an O-ring groove 82. A spring washer 84, as shown in FIGS. 3 and 4, surrounds each stud member 72 and engages shoulder 78 and the surface of mounting plate 64. Spring snap rings 85, shown in FIGS. 3 and 5, fit into slots 80 to hold the tubular studs in the mounting plate 64. A neoprene O-ring 86 is positioned in each of the grooves 82 as shown in FIGS. 3 and 6. A tubular element 88 is cemented in each of the stud members 72. Flexible tubes 90, one of which is shown in FIG. 1, are connected between each sampling tube 54 and a tubular element 88.

When the device is assembled, the cylindrical member 16 is inserted in the test section 10 with the support guide 32 passing through the holes in guide plates 34 and 36. When the member 16 reaches member 18, chamfered surface 94 on member 16 engages chamfered surface 96 on member 18 to guide surface 37 into surface 38. When chamfered surface 94 reaches chamfered surface 98, surface 37 is guided onto surface 40. The pin 42 is aligned with hole 43 and member 16 is then pushed the remaining distance on guide surface 40. Plug clamp member 44 is then inserted in the end of guide member 32 and the nut 48 is tightened on the end of stud 46 as shown in FIG. 1. Clamp member 50 is then placed over the stud 46 and nut 52 is tightened on the stud. The blade assembly 14 is then secured in the wind tunnel test section and provides added support for member 16. The guide surfaces 38 and 40 and the pin 42 and hole 43 act to align each of the studs 72 in alignment with the apertures 56. The springs 84 and O-rings 86 provide a seal between each of the studs 72 and the interface plate 28.

There is thus provided a separable coupling for coupling multiple pressure lines which provide a seal for the coupling elements for each of the pressure lines.

I claim:

1. An apparatus for interconnecting a first set of channels and a second set of channels, comprising: an interface plate member; a plurality of apertures in said plate member; means for connecting the first set of channels to said apertures; a plurality of tubular stud members; means for supporting said studs in alignment with said apertures; an O-ring surrounding each of said apertures and being positioned between each tubular stud and said plate member; means for holding each O-ring in sealing engagement with the plate member and one of said tubular studs; said means for supporting said stud member in alignment with said apertures including a mounting plate member; a guide member slidably supported on said mounting plate member; said guide member being slidable with respect to said mounting plate member; a plurality of holes in said guide member; one of said stud members being positioned in each of said holes in the guide member; each of said stud members having a first shoulder for engaging said guide member on the side remote from said mounting plate member; a plurality of holes in said mounting plate member, in alignment with the holes in the guide member, for receiving said stud members; means for retaining each of said stud members within said guide member and said mounting plate member.

2. The device as recited in claim 1 wherein said means for holding each O-ring in engagement with said interface plate member and one of said stud members includes an annular channel at the end of each stud member for receiving said O-rings; a second shoulder on each of said stud members; a spring member surrounding each stud member and being positioned between said mounting plate member and the second shoulder on each of the stud members; means secured to each of said stud members on the side of said mounting plate member, remote from the spring members, for holding the spring member in engagement with the mounting plate member and the second shoulders on the stud members.

3. The device as recited in claim 2 wherein said apertures in said interface plate members are positioned in an annular configuration; said guide member being an annular member for holding said stud members in an annular configuration corresponding to the annular configuration of said apertures.

4. The device as recited in claim 3 including a first cylindrical member; a second cylindrical member; means on said first cylindrical member and said second cylindrical member for axially aligning the first and second cylindrical members; means for securing said interface plate member to said first cylindrical member; means for securing said mounting plate member to said second cylindrical member; means on said first cylindrical member and said second cylindrical member for circumferentially positioning said first cylindrical member with respect to the second cylindrical member whereby said stud members are aligned with respect to the apertures in said interface plate member; means for securing the second cylindrical member to the first cylindrical member.

5. The device as recited in claim 4 including a plurality of pressure tap tubes in said second cylindrical member; means for connecting said pressure tap tubes to said tubular stud members.

* * * * *